United States Patent
Lin

(10) Patent No.: US 9,755,507 B2
(45) Date of Patent: Sep. 5, 2017

(54) REFERENCE VOLTAGE GENERATOR HAVING AT LEAST ONE BIPOLAR JUNCTION TRANSISTOR BIASED BY NEGATIVE BASE VOLTAGE AND ASSOCIATED REFERENCE VOLTAGE GENERATING METHOD

(71) Applicant: MEDIATEK INC., Hsin-Chu (TW)

(72) Inventor: Ta-Hsin Lin, Changhua County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/340,971

(22) Filed: Nov. 1, 2016

(65) Prior Publication Data

US 2017/0163148 A1 Jun. 8, 2017

Related U.S. Application Data

(60) Provisional application No. 62/262,387, filed on Dec. 3, 2015.

(51) Int. Cl.
*G05F 3/30* (2006.01)
*H02M 3/07* (2006.01)
*G01K 7/00* (2006.01)

(52) U.S. Cl.
CPC .............. *H02M 3/073* (2013.01); *G01K 7/00* (2013.01)

(58) Field of Classification Search
USPC .......................................................... 327/536
See application file for complete search history.

(56) References Cited

U.S. PATENT DOCUMENTS

| 6,504,486 | B1 | 1/2003 | Jong | |
|---|---|---|---|---|
| 2008/0284498 | A1 | 11/2008 | Xu | |
| 2009/0021234 | A1* | 1/2009 | Hsieh | G05F 3/30 323/313 |
| 2012/0194258 | A1* | 8/2012 | Nien | H02M 3/1588 327/512 |
| 2016/0211744 | A1* | 7/2016 | Arakawa | H02M 3/07 |

\* cited by examiner

*Primary Examiner* — Lincoln Donovan
*Assistant Examiner* — Patrick Chen
(74) *Attorney, Agent, or Firm* — Winston Hsu

(57) ABSTRACT

A reference voltage generator has a bandgap reference circuit and a negative voltage generator. The bandgap reference circuit generates a reference voltage according to at least one base-emitter voltage of at least one bipolar junction transistor. The negative voltage generator generates a negative voltage, wherein at least one base terminal of the at least one bipolar junction transistor is arranged to receive a base voltage derived from the negative voltage.

18 Claims, 8 Drawing Sheets

REFERENCE VOLTAGE GENERATOR HAVING AT LEAST ONE BIPOLAR JUNCTION TRANSISTOR BIASED BY NEGATIVE BASE VOLTAGE AND ASSOCIATED REFERENCE VOLTAGE GENERATING METHOD

CROSS REFERENCE TO RELATED APPLICATIONS

This application claims the benefit of U.S. provisional application No. 62/262,387, filed on Dec. 12, 2015 and incorporated herein by reference.

BACKGROUND

The present invention relates to generating a reference voltage, and more particularly, to a reference voltage generator having at least one bipolar junction transistor biased by a negative base voltage and an associated reference voltage generating method.

Voltage references have a major impact on the performance and accuracy of signal processing circuits. For example, a bandgap reference circuit is widely used in a variety of applications for providing a temperature independent voltage. Low voltage operation is an important design issue in mobile devices, because of demanding for low power consumption. Hence, when the bandgap reference circuit is used by a mobile device for supplying a reference voltage to signal processing circuits of the mobile device, the bandgap reference circuit is required to operate normally under a low power supply condition. However, as the semiconductor process technologies are developing to reduce the line widths, the maximum allowable supply voltage is scaled down accordingly. Usually, the conventional bandgap reference circuit relies on base-emitter voltages of bipolar junction transistors for generating the temperature independent voltage. Hence, the supply voltage of the conventional bandgap reference circuit is mainly constrained by the base-emitter voltage (e.g., 0.7V). As a result, the conventional bandgap reference circuit is not applicable to certain applications with lower supply voltages.

SUMMARY

One of the objectives of the claimed invention is to provide a reference voltage generator having at least one bipolar junction transistor biased by a negative base voltage and an associated reference voltage generating method.

According to a first aspect of the present invention, an exemplary reference voltage generator is disclosed. The exemplary reference voltage generator includes a bandgap reference circuit and a negative voltage generator. The bandgap reference circuit is arranged to generate a reference voltage according to at least one base-emitter voltage of at least one bipolar junction transistor. The negative voltage generator is arranged to generate a negative voltage, wherein at least one base terminal of the at least one bipolar junction transistor is arranged to receive a base voltage derived from the negative voltage.

According to a second aspect of the present invention, an exemplary reference voltage generating method is disclosed. The exemplary reference voltage generating method includes: generating a reference voltage according to at least one base-emitter voltage of at least one bipolar junction transistor included in a bandgap reference circuit; generating a negative voltage; and supplying a base voltage derived from the negative voltage to at least one base terminal of the at least one bipolar junction transistor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
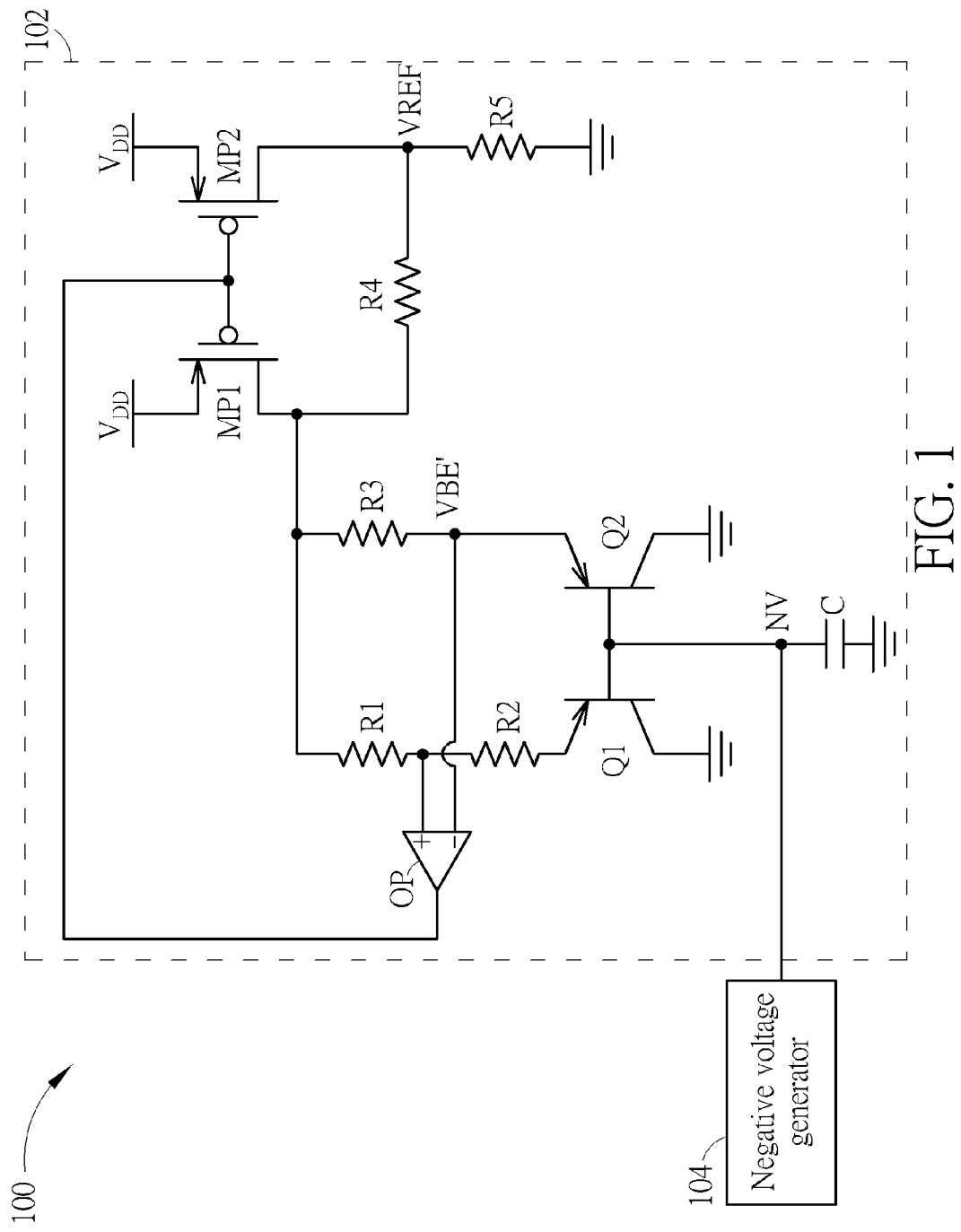
FIG. 1 is a diagram illustrating a first reference voltage generator according to an embodiment of the present invention.

FIG. 1 is a diagram illustrating a first reference voltage generator according to an embodiment of the present invention. The reference voltage generator 100 may be used to supply at least one voltage output to an application device (e.g., a thermal sensor). As shown in FIG. 1, the reference voltage generator 100 includes a bandgap reference circuit 102 and a negative voltage generator 104. In this embodiment, the bandgap reference circuit 102 includes an operational amplifier OP, a pair of bipolar junction transistors (BJTs) Q1, Q2, a pair of metal-oxide-semiconductor (MOS) transistors MP1, MP2, a capacitor C, and a plurality of resistors R1, R2, R3, R4, R5. The BJTs Q1 and Q2 are PNP transistors, and the MOS transistors MP1 and MP2 are P-channel metal-oxide-semiconductor (PMOS) transistors. The reference voltage VREF is generated at the drain terminal of the PMOS transistor MP2 according to the base-emitter voltages of the BJTs Q1 and Q2. It should be noted that the reference voltage VREF may be a temperature independent voltage or a temperature dependent voltage, depending upon actual resistance value settings of resistors. Further, the circuit structure of the bandgap reference circuit 102 shown in FIG. 1 is for illustrative purposes only. In some embodiments of the present invention, the bandgap reference circuit 102 may be modified to adopt a different bandgap reference design that is capable of generating a reference voltage according to at least one base-emitter voltage of at least one bipolar junction transistor. This also falls within the scope of the present invention. Since the present invention does not focus on the circuit configuration of the bandgap reference circuit 102, further description is omitted here for brevity.

In this embodiment, base terminals of the BJTs Q1 and Q2 are biased by a common voltage. If the common voltage is fixed at a ground voltage (i.e., 0V), the supply voltage VDD of the bandgap reference circuit 102 is constrained by Vbe+Vds, where Vbe (~0.7V) is the base-emitter voltage of a PNP transistor (e.g., Q1), and Vds (~0.15V) is the drain-source saturation voltage of a MOS transistor (e.g., MP1). Hence, the supply voltage VDD is required to exceed 0.85V, namely VDD>Vbe+Vds=0.7V+0.15V=0.85V. In other words, if the base voltage of the BJTs Q1 and Q2 is set by the ground voltage, the bandgap reference circuit 102 cannot be used in a low-power application with a supply voltage lower than 0.85V. For example, the core power (VDD) of an integrated circuit fabricated using advanced process may go low to 0.55V. It is impossible to generate a temperature independent voltage by using the bandgap reference circuit 102 with the base voltage of the BJTs Q1 and Q2 set by the ground voltage.

The present invention therefore proposes the reference voltage generator 100, including the bandgap reference circuit 102 and the negative voltage generator 104, to deal with the low supply voltage condition (VDD=~0.55V). In this embodiment, the negative voltage generator 104 is arranged to generate a negative voltage NV to make the BJTs Q1 and Q2 biased by a negative base voltage. The same concept can be applied to a different bandgap reference design employed by the bandgap reference circuit 102, such that at least one base terminal of at least one BJT in a bandgap reference circuit receives a base voltage derived from the negative voltage NV. For example, the negative voltage NV may be directly supplied to the at least one base terminal of the at least one BJT.

In this embodiment, the bandgap reference voltage 102 is configured to have two BJTs Q1 and Q2 with base terminals connected to a common voltage. Hence, the base terminals of two BJTs Q1 and Q2 receive the common voltage set by the negative voltage generator 104. Since the BJTs Q1 and Q2 are biased by a negative base voltage (e.g., NV), the emitter voltage VBE' has a lower voltage level correspondingly, where VBE'=NV+Vbe. For example, assuming that the emitter-base voltage Vbe is 0.7V and the negative voltage NV is ~0.35V, the emitter voltage VBE' is equal to 0.35V. The supply voltage VDD is constrained by VBE'+Vds. For example, VDD>VBE'+Vds=0.35V+0.15V=0.5V. In this way, the proposed reference voltage generator 100 can operate normally under a low supply voltage condition (VDD=~0.55V).

Figure 2:
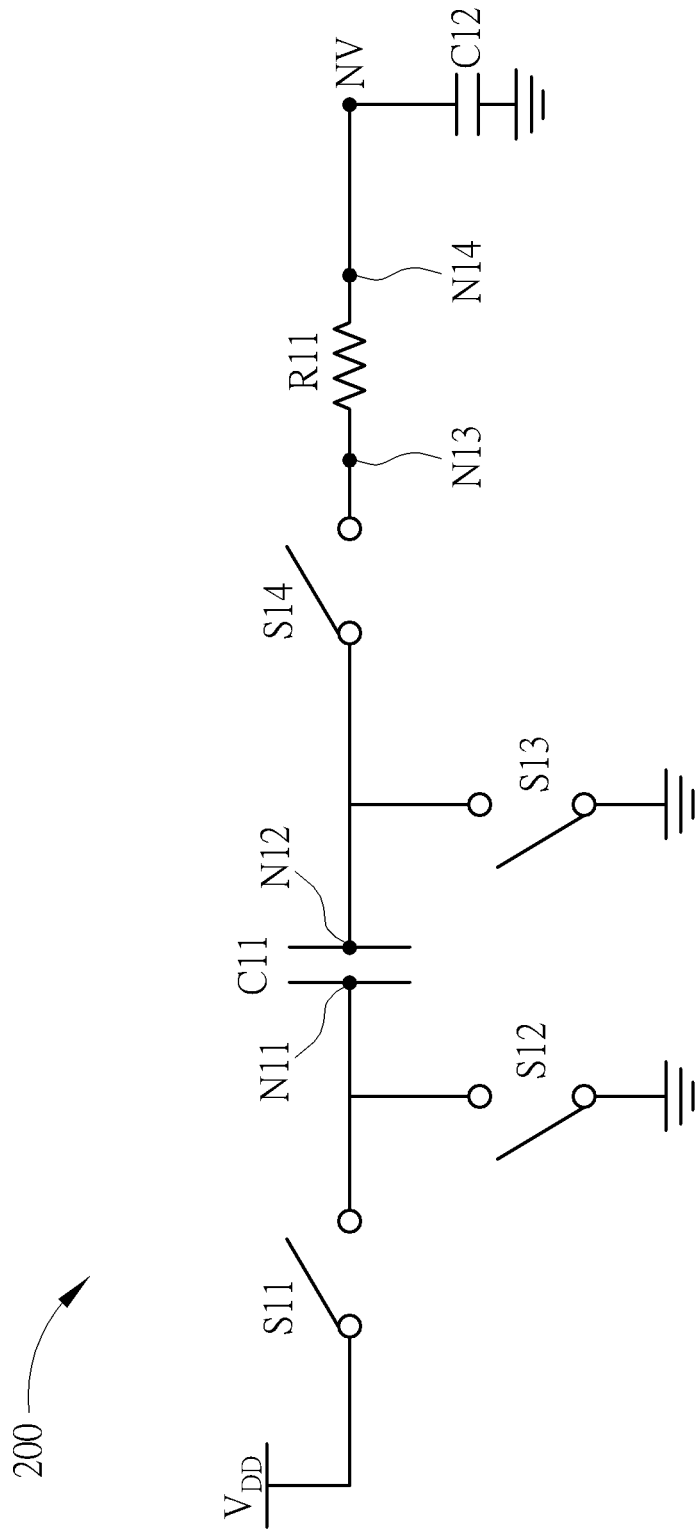
FIG. 2 is a diagram illustrating a negative voltage generator according to an embodiment of the present invention.

FIG. 2 is a diagram illustrating a negative voltage generator according to an embodiment of the present invention. The negative voltage generator 104 shown in FIG. 1 may be implemented using the negative voltage generator 200 shown in FIG. 2. In this embodiment, the negative voltage generator 200 employs a charge pump circuit for generating a lower voltage (e.g., negative voltage NV) according to a high voltage (e.g., supply voltage VDD). As shown in FIG. 2, the negative voltage generator 200 includes a resistor R11, a plurality of capacitors C11, C12, and a plurality of switches S11, S12, S13, S14. The switch S11 is coupled between the supply voltage VDD (e.g., 0.55V) and a first end N11 of the capacitor C11. The switch S12 is coupled between the first end N11 of the capacitor C11 and a ground voltage (e.g., 0V). The switch S13 is coupled between the second end N12 of the capacitor C11 and the ground voltage. The switch S14 is coupled between the second end N12 of the capacitor C11 and a first end N13 of the resistor R11. The capacitor C12 is coupled between a second end N14 of the resistor R11 and the ground voltage. With a proper control of on/off statuses of the switches S11-S14, the desired negative voltage NV can be generated at the second end N14 of the resistor R11.

Figure 3:
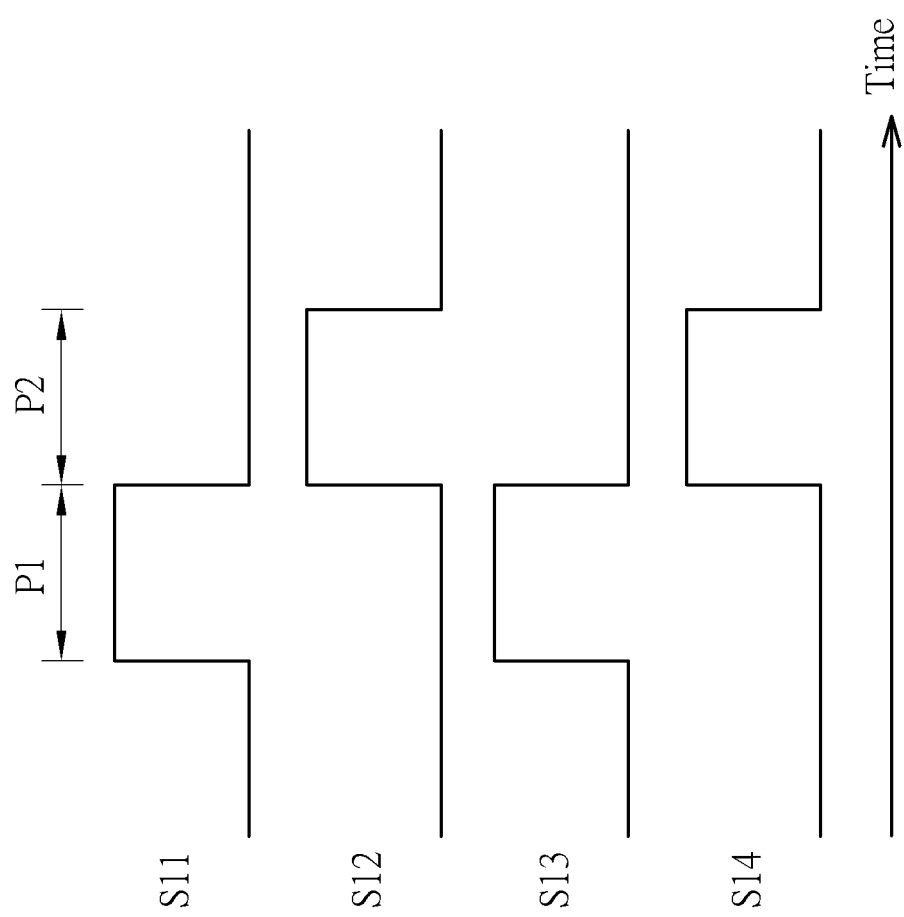
FIG. 3 is a diagram illustrating a control sequence of switches S11-S14 shown in FIG. 2.

FIG. 3 is a diagram illustrating a control sequence of the switches S11-S14 shown in FIG. 2. During a first time period P1 of one charge pump cycle, the switches S11 and S13 are both switched on, and the switches S12 and S14 are both switched off. Hence, the first end N11 of the capacitor C11 is coupled to the supply voltage VDD, and the second end N12 of the capacitor C11 is coupled to the ground voltage. In this way, the capacitor C11 is charged by the applied voltage difference (VDD−0) during the first time period P1. The amount of charge stored in the capacitor C11 may be represented by C11*(VDD−0).

During a second time period P2 of the charge pump cycle, the switches S12 and S14 are both switched on, and the switches S11 and S13 are both switched off. Hence, the first end N11 of the capacitor C11 is coupled to the ground voltage, and the second end N12 of the capacitor C11 is coupled to the first end N13 of the resistor R11. Since the amount of charge stored in the capacitor C11 is C11*(VDD−0) at the time the switches S12 and S14 are switched on and the switches S11 and S13 are switched off, the voltage level at the second end N12 of the capacitor C11 becomes (0−VDD). In other words, a negative voltage −VDD is created at the second end N12 of the capacitor C11. The current flowing from the second end N14 of the resistor R11 to the first end N13 of the resistor R11 creates a voltage drop $V_{R11}$ across the resistor R11. Hence, the negative voltage NV at the second end N14 of the resistor N13 is equal to −VDD+$V_{R11}$.

It should be noted that the circuit configuration shown in FIG. 2 is for illustrative purposes only. Alternatively, the negative voltage generator 104 shown in FIG. 1 may be implemented using a different circuit configuration for generating the required negative voltage NV. This also falls within the scope of the present invention.

The emitter voltage VBE' is a temperature dependent voltage. The reference voltage VREF may be a temperature independent voltage or a temperature dependent voltage, depending upon resistance vale settings of resistors in the bandgap reference circuit 102. Hence, one or both of the emitter voltage VBE' and the reference voltage VREF may be supplied from the reference voltage generator 100 to an application device (e.g., a thermal sensor). However, the negative voltage NV generated from the negative voltage generator 104 may be affected by process variation to deviate from its nominal value. For example, the negative voltage NV generated from the negative voltage generator 200 manufactured by a first semiconductor process is different from the negative voltage NV generated from the same negative voltage generator 200 manufactured by a second semiconductor process. Since the emitter voltage VBE' is determined by the base-emitter voltage Vbe and the base voltage (which is set by the negative voltage NV), the emitter voltage VBE' may deviate from its nominal value due to process variation. Similarly, since the reference voltage VREF is affected by the variation of the emitter voltage VBE', the reference voltage VREF may also deviate from its nominal value due to process variation.

Figure 4:
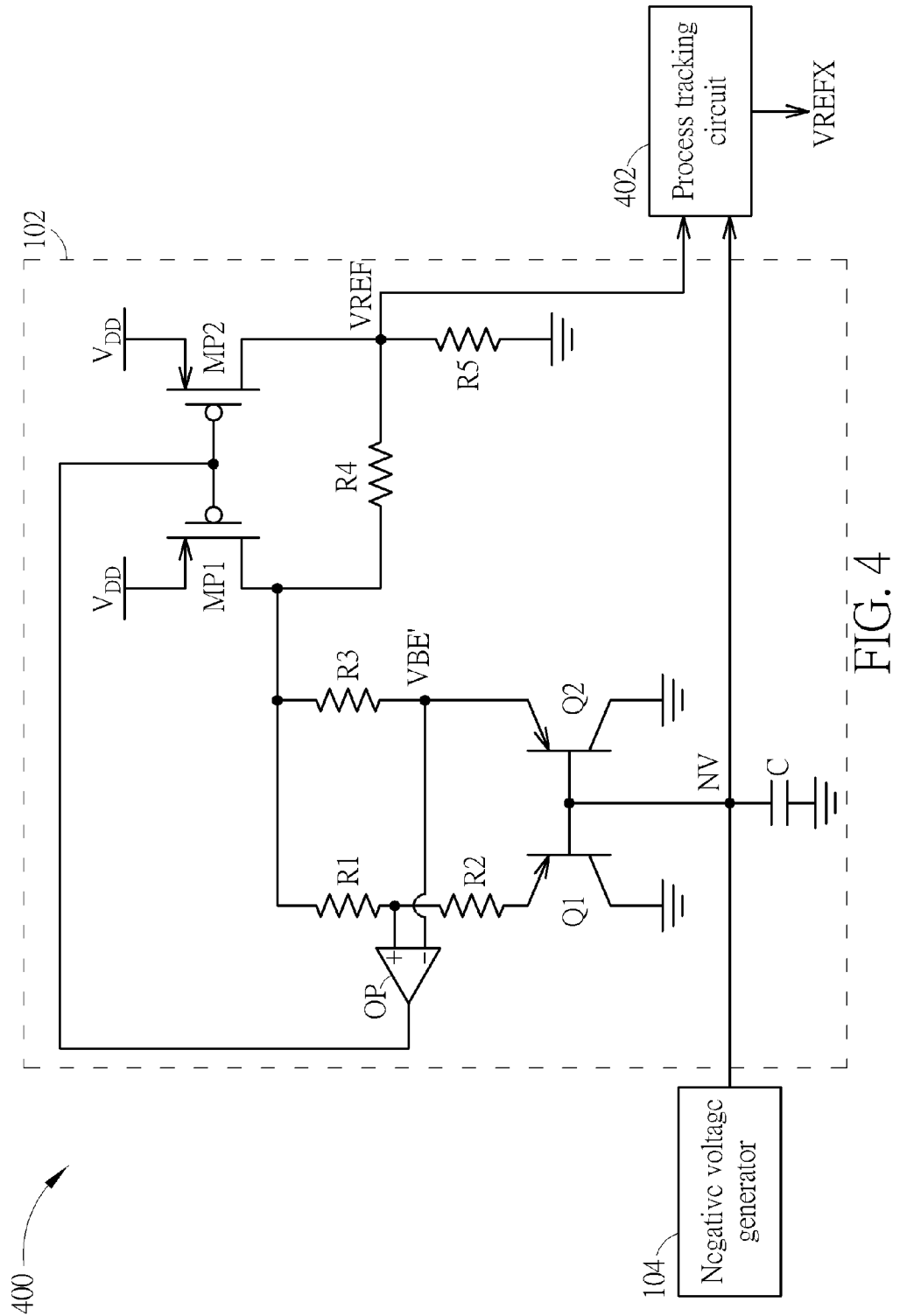
FIG. 4 is a diagram illustrating a second reference voltage generator according to an embodiment of the present invention.

With regard to the reference voltage VREF, a process tracking circuit can be used to generate a corresponding process independent reference voltage. FIG. 4 is a diagram illustrating a second reference voltage generator according to an embodiment of the present invention. The reference voltage generator 400 may be used to supply at least one voltage output to an application device (e.g., a thermal sensor). The major difference between the reference voltage generators 100 and 400 is that the reference voltage generator 400 further includes a process tracking circuit 402. The process tracking circuit 402 is arranged to receive the negative voltage NV generated from the negative voltage generator 104, receive the reference voltage VREF generated at the drain terminal of the MOS transistor MP2, and generate a process independent reference voltage VREFX according to the process dependent negative voltage NV and the process dependent reference voltage VREF. Suppose that the voltage deviation caused by process variation is denoted by Δ. Hence, the process dependent negative voltage may be NV+Δ, and the process dependent reference voltage may be VREF+Δ. The basic idea is to perform subtraction based on the process dependent reference voltage VREF+Δ and the process dependent negative voltage NV+Δ to thereby generate a voltage output without the voltage deviation Δ resulting from process variation.

Figure 5:
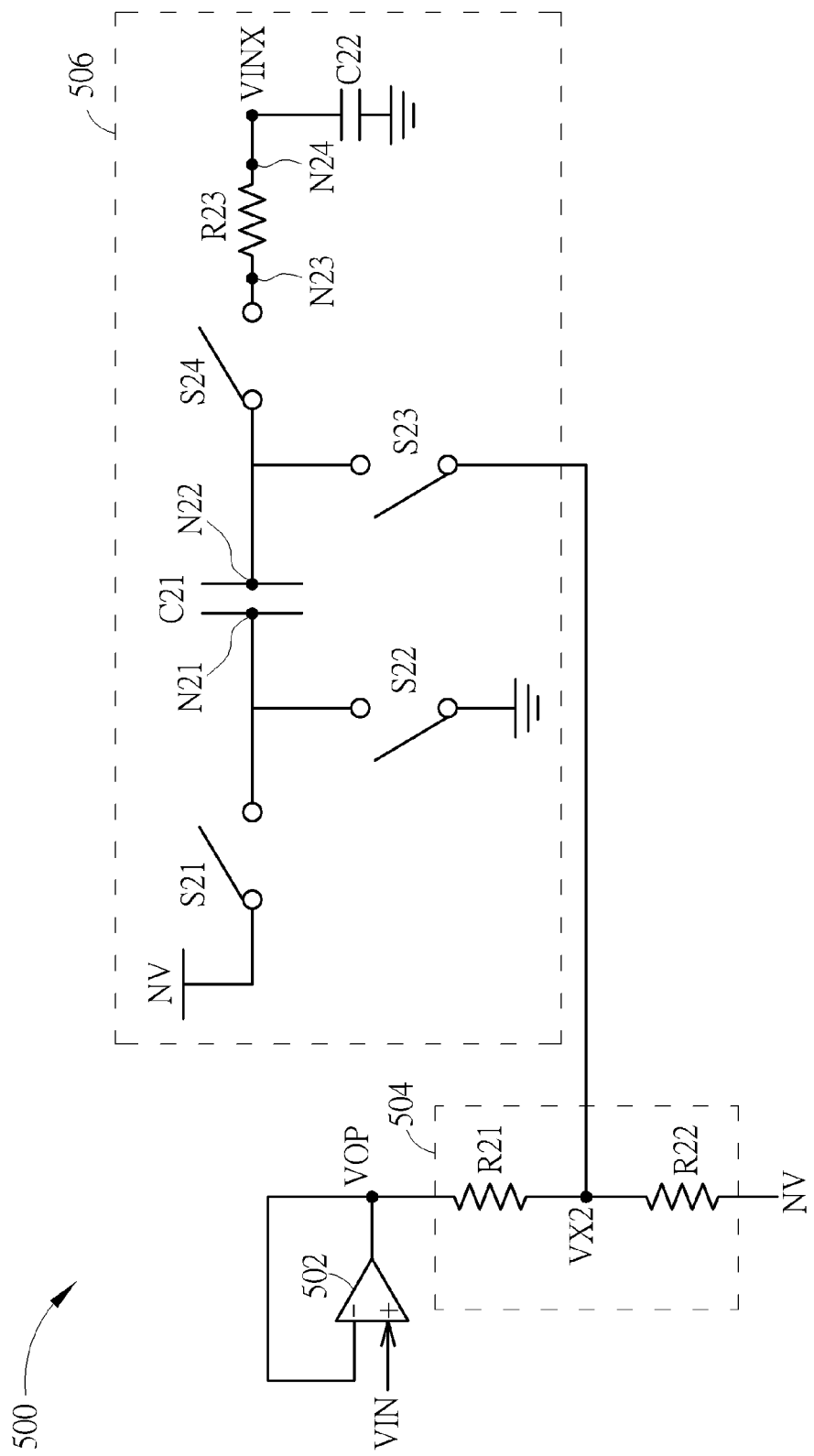
FIG. 5 is a diagram illustrating a process tracking circuit according to an embodiment of the present invention.

FIG. 5 is a diagram illustrating a process tracking circuit according to an embodiment of the present invention. The process tracking circuit 402 shown in FIG. 4 may be implemented using the process tracking circuit 500 shown in FIG. 5. In this embodiment, the process tracking circuit 500 includes an operational amplifier 502, a voltage divider 504, and a process independent voltage generator 506. The operational amplifier 502 has a first input node (e.g., a non-inverting input node "+"), a second input node (e.g., an inverting input node "−") and an output node, wherein the first input node is arranged to receive an input voltage VIN, and the second input node is coupled to the output node. When the process tracking circuit 402 is implemented using the process tracking circuit 500, the input voltage VIN received by the process tracking circuit 500 is the reference voltage VREF, and a process independent voltage VINX generated by the process tracking circuit 500 is the process independent reference voltage VREFX. The operational amplifier 502 generates an amplifier output voltage VOP at the output node according to the reference voltage VREF. More specifically, the operational amplifier 502 is to create a duplicate of the reference voltage VREF at its output node. In this way, the process tracking circuit 500 can process the duplicate of the reference voltage VREF without affecting the reference voltage VREF generated at the bandgap reference circuit 102.

The voltage divider 504 is composed of resistors R21 and R22, and is coupled between the amplifier output voltage VOP (VOP=VIN=VREF) and the negative voltage NV. Hence, the voltage divider 504 is arranged to generate a divided voltage VX2 according to the amplifier output voltage VOP and the negative voltage NV. The voltage divider 504 is used to make the divided voltage VX2 lower than the input voltage VIN (VIN=VREF) and have the same voltage deviation Δ possessed by the negative voltage NV. Since subtraction of the voltage deviation Δ is performed for the divided voltage VX2 according to the negative voltage NV, it is equivalent to increasing the divided voltage VX2 by an absolute value of the negative voltage NV. With a proper setting of the divided voltage VX2 (which is lower than the input voltage VIN (VIN=VREF)), subtraction of the voltage deviation Δ does not make a process independent voltage VINX (VINX=VREFX) exceed the input voltage VIN (VIN=VREF). In this way, the process independent voltage VINX (VINX=VREFX) can still meet the requirement of an application device operating under a low supply voltage. In one exemplary design, the resistors R21 and R22 are configured to have the same resistance value. Therefore, the divided voltage VX2 is equal to $$\frac{VOP+NV}{2},$$

where VOP=VIN=VREF. If the voltage deviation Δ is considered, the divided voltage VX2 is equal to $$\frac{(VOP+\Delta)+(NV+\Delta)}{2}=\frac{VOP+NV}{2}+\Delta,$$

where VOP=VIN=VREF.

The process independent voltage generator 506 is arranged to generate the process independent voltage VINX (VINX=VREFX) according to the negative voltage NV and the divided voltage VX2. In this embodiment, the process independent voltage generator 506 employs a charge pump circuit for performing subtraction of the voltage deviation Δ and generating the process independent voltage VINX. As shown in FIG. 5, the process independent voltage generator 506 includes a resistor R23, a plurality of capacitors C21, C22, and a plurality of switches S21, S22, S23, S24. The switch S21 is coupled between the negative voltage NV (e.g., −0.35V) and a first end N21 of the capacitor C21. The switch S22 is coupled between the first end N21 of the capacitor C21 and a ground voltage (e.g., 0V). The switch S23 is coupled between the second end N22 of the capacitor C21 and the ground voltage. The switch S24 is coupled between the second end N22 of the capacitor C21 and a first end N23 of the resistor R23. The capacitor C22 is coupled between a second end N24 of the resistor R23 and the ground voltage. With a proper control of on/off statuses of the switches S21-S24, the desired process independent voltage VINX (VINX=VREFX) can be generated at the second end N24 of the resistor R23.

Figure 6:
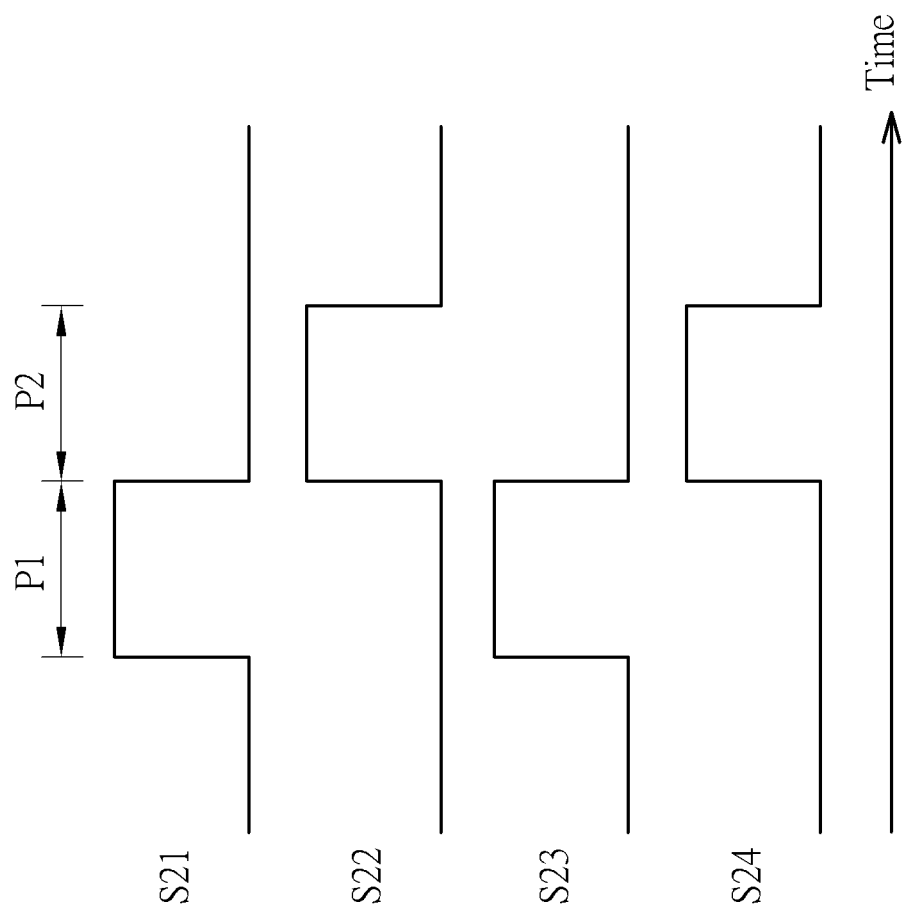
FIG. 6 is a diagram illustrating a control sequence of switches S21-S24 shown in FIG. 5.

FIG. 6 is a diagram illustrating a control sequence of the switches S21-S24 shown in FIG. 5. During a first time period P1 of one charge pump cycle, the switches S21 and S23 are both switched on, and the switches S22 and S24 are both switched off. Hence, the first end N21 of the capacitor C21 is coupled to the negative voltage NV, and the second end N22 of the capacitor C21 is coupled to the ground voltage. In this way, the capacitor C21 is charged by the applied voltage difference (0−NV) during the first time period P1. The amount of charge stored in the capacitor C21 may be represented by C21*(0−NV). If the voltage deviation Δ is considered, the amount of charge stored in the capacitor C21 may be represented by C21*[0−(NV+Δ)].

During a second time period P2 of the charge pump cycle, the switches S22 and S24 are both switched on, and the switches S21 and S23 are both switched off. Hence, the first end N21 of the capacitor C21 is coupled to the ground voltage, and the divided voltage VX2 is supplied to the second end N22 of the capacitor C21. Since the amount of charge stored in the capacitor C11 is C21*(0−NV) (or C21*[0−(NV+Δ)], if voltage deviation Δ is considered) at the time the switches S22 and S24 are switched on and the switches S21 and S23 are switched off, the voltage level at the second end N22 of the capacitor C21 becomes $$(0 - NV) + VX2 = VX2 - NV = \frac{VOP}{2} -$$
$$\frac{NV}{2} \left( \text{or } [0 - (NV + \Delta)] + (VX2 + \Delta) = VX2 - NV = \frac{VOP}{2} - \frac{NV}{2}, \right.$$

if voltage deviation Δ is considered). Hence, a process independent voltage is obtained at the second end N22 of the capacitor C21. The current flowing from the first end N23 of the resistor R23 to the second end N24 of the resistor R23 creates a voltage drop $V_{R23}$ across the resistor R23. Hence, the process independent voltage VINX (VINX=VREFX) at the second end N24 of the resistor R23 is equal to $$\frac{VOP}{2} - \frac{NV}{2} - V_{R23},$$

where VOP=VIN=VREF.

It should be noted that the circuit configuration shown in FIG. 5 is for illustrative purposes only. Alternatively, the process tracking circuit 402 shown in FIG. 4 may be implemented using a different circuit configuration for generating the required process independent voltage VREFX. This also falls within the scope of the present invention.

As mentioned above, the emitter voltage VBE' is a temperature dependent voltage. The emitter voltage VBE' may be supplied from the reference voltage generator 100 to an application device. However, the negative voltage NV generated from the negative voltage generator 104 may be affected by process variation, which makes the emitter voltage VBE' deviate from its nominal value. With regard to the emitter voltage VBE', a process tracking circuit can be used to generate a corresponding process independent emitter voltage.

Figure 7:
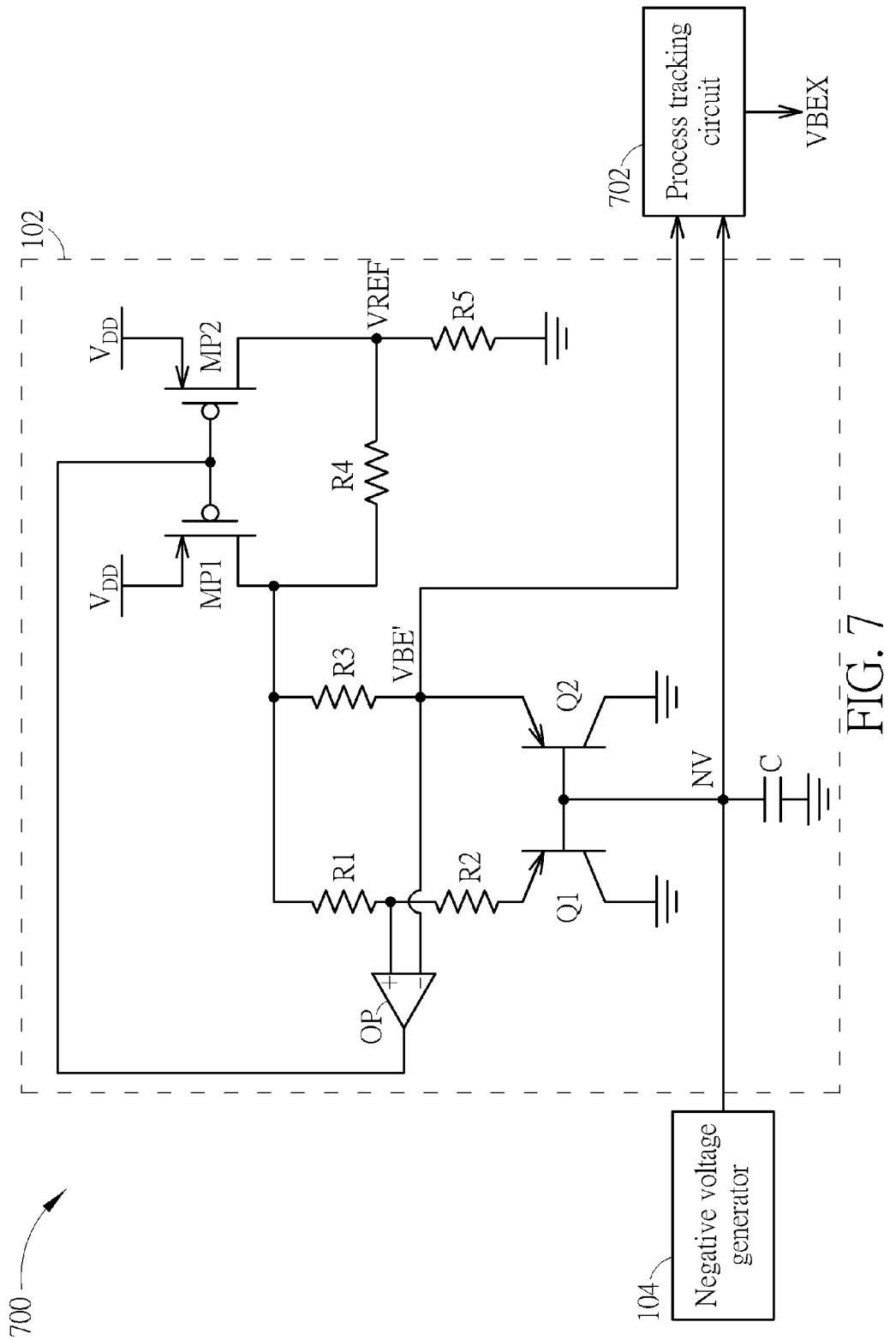
FIG. 7 is a diagram illustrating a third reference voltage generator according to an embodiment of the present invention.

FIG. 7 is a diagram illustrating a third reference voltage generator according to an embodiment of the present invention. The reference voltage generator 700 may be used to supply at least one voltage output to an application device (e.g., a thermal sensor). In this embodiment, the process tracking circuit 702 is arranged to receive the negative voltage NV generated from the negative voltage generator 104, receive the emitter voltage VBE' generated at the emitter terminal of the BJT Q2, and generate a process independent emitter voltage VBEX according to the negative voltage NV and the emitter voltage VBE'. For example, the process tracking circuit 702 may be implemented using the process tracking circuit 500 shown in FIG. 5, where the input voltage VIN received by the operational amplifier 502 is the emitter voltage VBE', and the process independent voltage VINX generated at the second end of the resistor R23 is the process independent reference voltage VBEX. Since a person skilled in the art can readily understand details of using the process tracking circuit 500 to generate the process independent emitter voltage VBEX according to the negative voltage NV and the emitter voltage VBE' after reading above specification description associated with FIG. 5 and FIG. 6, further description is omitted here for brevity.

Figure 8:
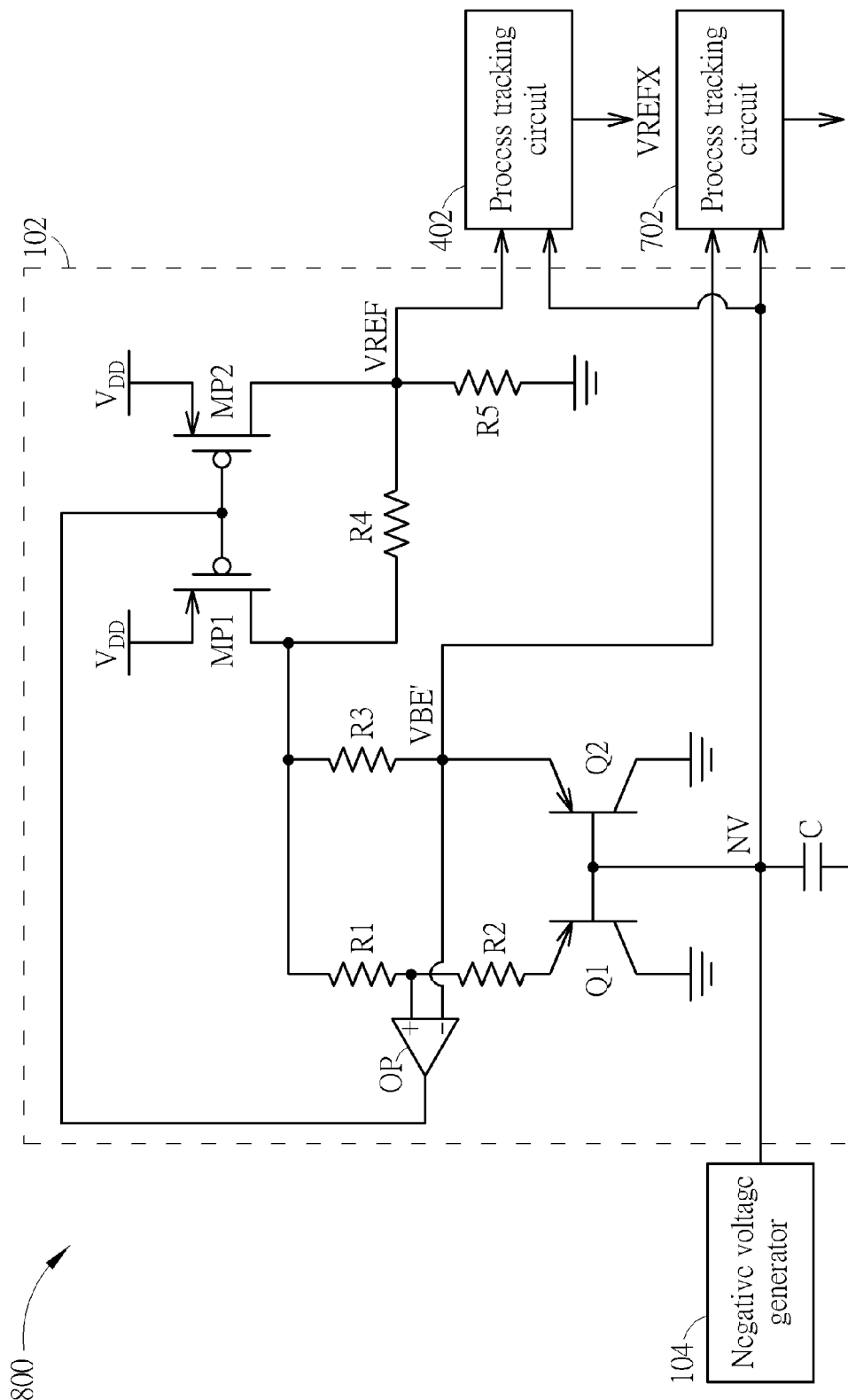
FIG. 8 is a diagram illustrating a fourth reference voltage generator according to an embodiment of the present invention.

When an application device (e.g., a thermal sensor) requires multiple process independent voltages, the reference voltage generator 100 shown in FIG. 1 may be modified to include multiple process tracking circuits. FIG. 8 is a diagram illustrating a fourth reference voltage generator according to an embodiment of the present invention. The reference voltage generator 800 includes the process tracking circuit 402 for generating the process independent voltage VREFX, and further includes the process tracking circuit 702 for generating the process independent emitter voltage VBE'. Since a person skilled in the art can readily understand details of the reference voltage generator 800 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A reference voltage generator comprising:
   a bandgap reference circuit, arranged to generate a reference voltage according to at least one base-emitter voltage of at least one bipolar junction transistor;
   a negative voltage generator, arranged to generate a negative voltage, wherein at least one base terminal of the at least one bipolar junction transistor is arranged to receive a base voltage derived from the negative voltage; and
   a process tracking circuit, arranged to receive the negative voltage from the negative voltage generator, receive a selected voltage from the bandgap reference circuit, and generate a process independent voltage according to the negative voltage and the selected voltage.

2. The reference voltage generator of claim 1, wherein the negative voltage is supplied to the at least one base terminal of the at least one bipolar junction transistor.

3. The reference voltage generator of claim 1, wherein the negative voltage generator comprises a charge pump circuit.

4. The reference voltage generator of claim 3, wherein the charge pump circuit comprises:
   a first capacitor, having a first end and a second end;
   a first switch, coupled between a first voltage and the first end of the first capacitor;
   a second switch, coupled between the first end of the first capacitor and a second voltage;
   a third switch, coupled between the second end of the first capacitor and the second voltage;
   a resistor, having a first end and a second end;
   a fourth switch, coupled between the second end of the first capacitor and the first end of the resistor; and
   a second capacitor, coupled between the second end of the resistor and the second voltage;
   wherein the negative voltage is generated at the second end of the resistor; during a first time period, the first switch and the third switch are both switched on, and the second switch and the fourth switch are both switched off; and during a second time period following the first time period, the second switch and the fourth switch are both switched on, and the first switch and the third switch are both switched off.

5. The reference voltage generator of claim 1, wherein the selected voltage is the reference voltage.

6. The reference voltage generator of claim 1, wherein the selected voltage is at least one emitter voltage of the at least one bipolar junction transistor.

7. The reference voltage generator of claim 1, wherein the process tracking circuit comprises:
   an operational amplifier, having a first input node, a second input node and an output node, wherein the first input node is arranged to receive the selected voltage, the second input node is coupled to the output node, and the operational amplifier generates an amplifier output voltage at the output node according to the selected voltage;
   a voltage divider, coupled between the amplifier output voltage and the negative voltage, the voltage divider arranged to generate a divided voltage according to the amplifier output voltage and the negative voltage; and
   a process independent voltage generator, arranged to generate the process independent voltage according to the negative voltage and the divided voltage.

8. The reference voltage generator of claim 7, wherein the process independent voltage generator comprises:
   a first capacitor, having a first end and a second end;
   a first switch, coupled between the negative voltage and the first end of the first capacitor;
   a second switch, coupled between the first end of the first capacitor and a common voltage;
   a third switch, coupled between the second end of the first capacitor and the common voltage;
   a resistor, having a first end and a second end;
   a fourth switch, coupled between the second end of the first capacitor and the first end of the resistor; and
   a second capacitor, coupled between the second end of the resistor and the common voltage;
   wherein the process independent voltage is generated at the second end of the resistor; during a first time period, the first switch and the third switch are both switched on, and the second switch and the fourth switch are both switched off; and during a second time period following the first time period, the second switch and the fourth switch are both switched on, and the first switch and the second switch are both switched off.

9. The reference voltage generator of claim 1, wherein reference voltage generator supplies at least one voltage output to a thermal sensor.

10. A reference voltage generating method comprising:
    generating a reference voltage according to at least one base-emitter voltage of at least one bipolar junction transistor included in a bandgap reference circuit;
    generating a negative voltage;
    supplying a base voltage derived from the negative voltage to at least one base terminal of the at least one bipolar junction transistor; and
    generating a process independent voltage according to a selected voltage obtained from the bandgap reference circuit and the negative voltage.

11. The reference voltage generating method of claim 10, wherein the negative voltage is supplied to the at least one base terminal of the at least one bipolar junction transistor.

12. The reference voltage generating method of claim 10, wherein
    generating the negative voltage comprises:
    generating the negative voltage by a charge pump circuit.

13. The reference voltage generating method of claim 12, wherein the charge pump circuit comprises:
    a first capacitor, having a first end and a second end;
    a first switch, coupled between a first voltage and the first end of the first capacitor;
    a second switch, coupled between the first end of the first capacitor and a second voltage;
    a third switch, coupled between the second end of the first capacitor and the second voltage;
    a resistor, having a first end and a second end;
    a fourth switch, coupled between the second end of the first capacitor and the first end of the resistor; and
    a second capacitor, coupled between the second end of the resistor and the second voltage;
    wherein the negative voltage is generated at the second end of the resistor; during a first time period, the first switch and the third switch are both switched on, and the second switch and the fourth switch are both switched off; and during a second time period following the first time period, the second switch and the fourth switch are both switched on, and the first switch and the third switch are both switched off.

14. The reference voltage generating method of claim 10, wherein the selected voltage is the reference voltage.

15. The reference voltage generating method of claim 10, wherein the selected voltage is at least one emitter voltage of the at least one bipolar junction transistor.

16. The reference voltage generating method of claim 10, wherein generating the process independent voltage according to the selected voltage and the negative voltage comprises:
    generating an amplifier output voltage at an output node of an operational amplifier according to the selected voltage received at a first input node of the operational amplifier, wherein a second input node of the operational amplifier is coupled to the output node;
    performing a voltage dividing operation upon the amplifier output voltage and the negative voltage to generate a divided voltage; and
    generating the process independent voltage according to the negative voltage and the divided voltage.

17. The reference voltage generating method of claim 16, wherein the process independent voltage is generated by using:
    a first capacitor, having a first end and a second end;
    a first switch, coupled between the negative voltage and the first end of the first capacitor;
    a second switch, coupled between the first end of the first capacitor and a common voltage;
    a third switch, coupled between the second end of the first capacitor and the common voltage;
    a resistor, having a first end and a second end;
    a fourth switch, coupled between the second end of the first capacitor and the first end of the resistor; and
    a second capacitor, coupled between the second end of the resistor and the common voltage;
    wherein the process independent voltage is generated at the second end of the resistor; during a first time period, the first switch and the third switch are both switched on, and the second switch and the fourth switch are both switched off; and during a second time period following the first time period, the second switch and the fourth switch are both switched on, and the first switch and the second switch are both switched off.

18. The reference voltage generating method of claim 10, further comprising:
    supplying at least one voltage output of the bandgap reference circuit to a thermal sensor.

* * * * *